United States Patent
Zhang et al.

(10) Patent No.: US 11,889,359 B2
(45) Date of Patent: Jan. 30, 2024

(54) FULL DUPLEX BEAM FAILURE DETECTION AND UPLINK RESOURCES DETERMINATION FOR TRANSMITTING RECOVERY REQUEST

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/470,170

(22) Filed: Sep. 9, 2021

(65) Prior Publication Data

US 2022/0086707 A1    Mar. 17, 2022

Related U.S. Application Data

(60) Provisional application No. 63/079,354, filed on Sep. 16, 2020.

(51) Int. Cl.
| | |
|---|---|
| *H04W 36/00* | (2009.01) |
| *H04W 36/30* | (2009.01) |
| *H04L 5/14* | (2006.01) |
| *H04W 24/08* | (2009.01) |

(52) U.S. Cl.
CPC ........... *H04W 36/0058* (2018.08); *H04L 5/14* (2013.01); *H04W 24/08* (2013.01); *H04W 36/30* (2013.01)

(58) Field of Classification Search
None
See application file for complete search history.

(56) References Cited

U.S. PATENT DOCUMENTS

| | | | | |
|---|---|---|---|---|
| 2019/0306924 | A1* | 10/2019 | Zhang | H04B 7/063 |
| 2022/0053353 | A1* | 2/2022 | Lee | H04W 24/10 |
| 2022/0070053 | A1* | 3/2022 | Matsumura | H04B 7/088 |
| 2022/0116094 | A1* | 4/2022 | Wang | H04L 5/001 |
| 2022/0124860 | A1* | 4/2022 | Guo | H04W 72/20 |

* cited by examiner

*Primary Examiner* — Saumit Shah
(74) *Attorney, Agent, or Firm* — Procopio, Cory, Hargreaves & Savitch LLP

(57) ABSTRACT

When a beam failure is detected, appropriate actions may be taken to recover the connection. A beam failure recovery request may be sent by a user equipment (UE) apparatus to initiate the recovery of the connection. The UE detects a beam failure for at least one active downlink and uplink beam pair for full duplex communication with a secondary cell (SCell). The UE transmits a beam failure recovery request (BFRQ) for the SCell to a base station using an uplink resource of the SCell or a primary cell (PCell) based on a layer 1 signal to interference and noise ratio (L1-SINR) measurement for the at least one active downlink and uplink beam pair of the SCell.

30 Claims, 12 Drawing Sheets

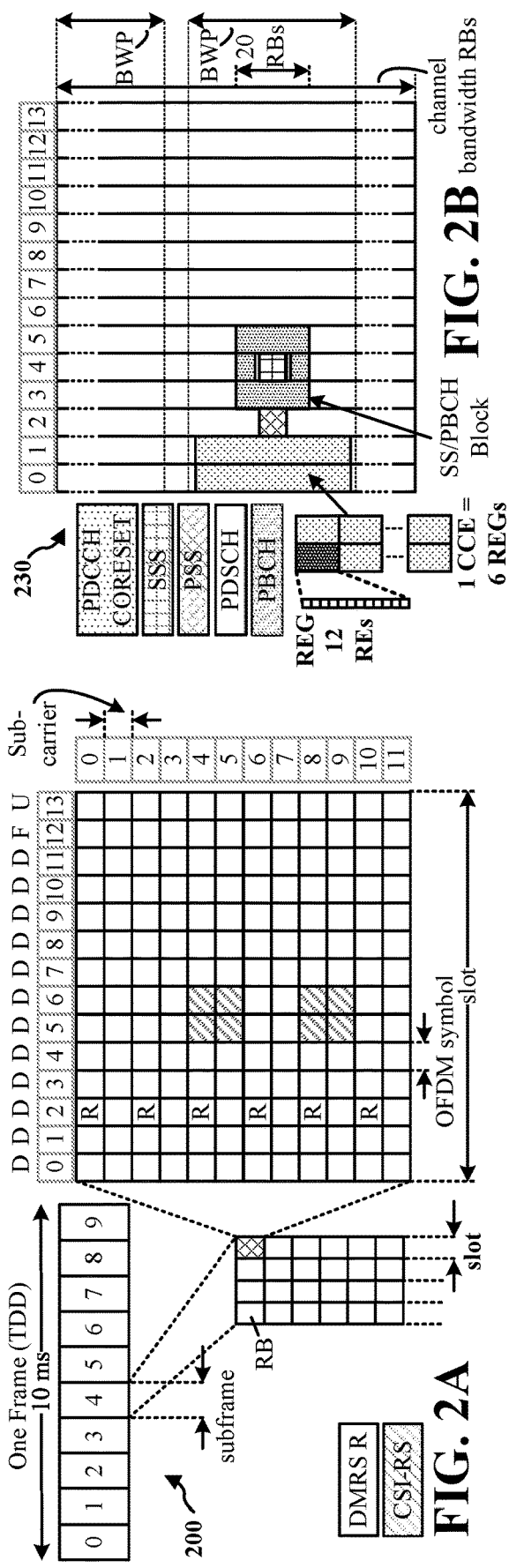
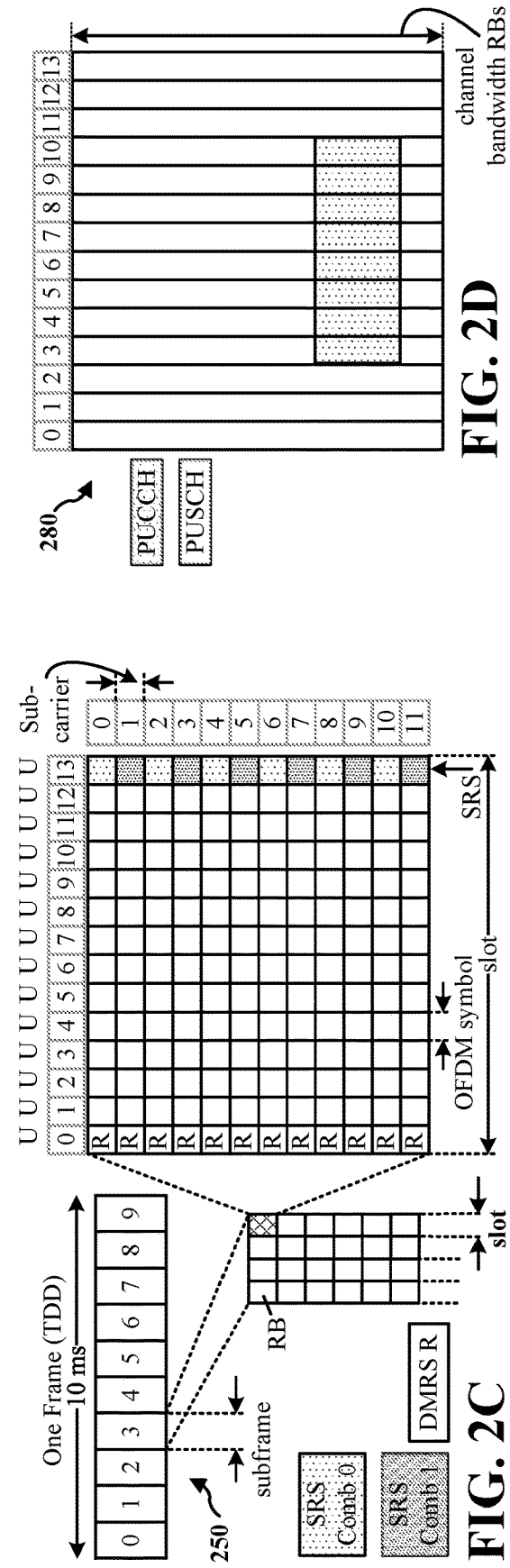

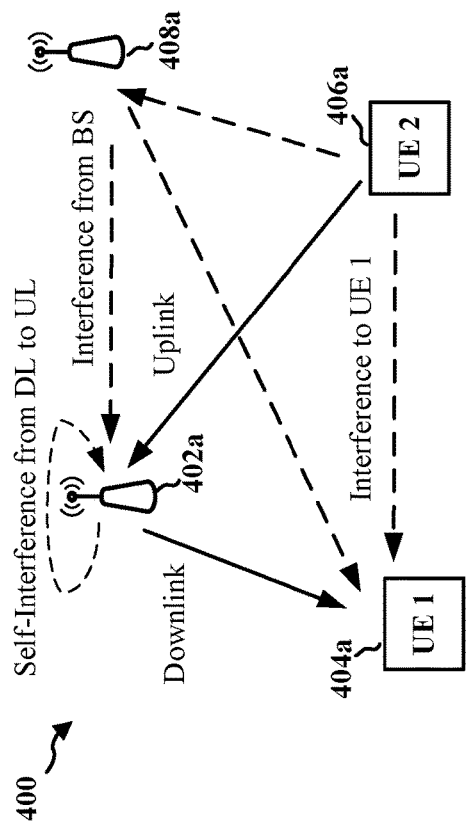
FIG. 4A
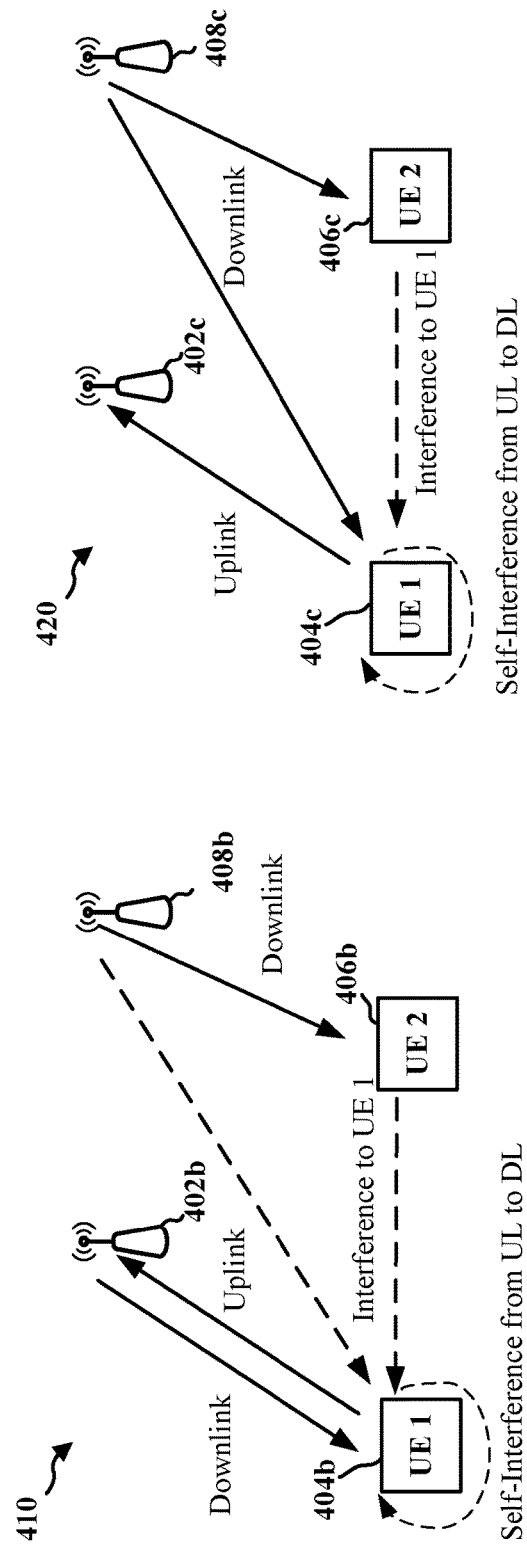
FIG. 4C
FIG. 4B

FULL DUPLEX BEAM FAILURE DETECTION AND UPLINK RESOURCES DETERMINATION FOR TRANSMITTING RECOVERY REQUEST

CROSS REFERENCE TO RELATED APPLICATION(S)

This application claims the benefit of and priority to U.S. Provisional Application Ser. No. 63/079,354, entitled "Full Duplex Beam Failure Detection and Uplink Resources Determination for Transmitting Recovery Request" and filed on Sep. 16, 2020, which is expressly incorporated by reference herein in its entirety.

TECHNICAL FIELD

The present disclosure relates generally to communication systems, and more particularly, to wireless communication based on directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus is configured to detect a beam failure for at least one active downlink and uplink beam pair for full duplex communication with a secondary cell (SCell). The apparatus is configured to transmit a beam failure recovery request (BFRQ) for the SCell to a base station using an uplink resource of the SCell or a primary cell (PCell) based on a layer 1 signal to interference and noise ratio (L1-SINR) measurement for the at least one active downlink and uplink beam pair of the SCell.

In an aspect of the disclosure, a method, a computer-readable medium, and an apparatus for wireless communication at a base station are provided. The apparatus is configured to serve as an SCell for full duplex communication with a UE configured with an uplink beam and one or more active downlink beams. The apparatus is configured to receive a BFRQ from the UE for at least one active downlink beam for the SCell due to self-interference on the SCell for the full duplex communication.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A, 4B, and 4C illustrate example diagrams of full duplex wireless communication.

DETAILED DESCRIPTION

Figure 1:
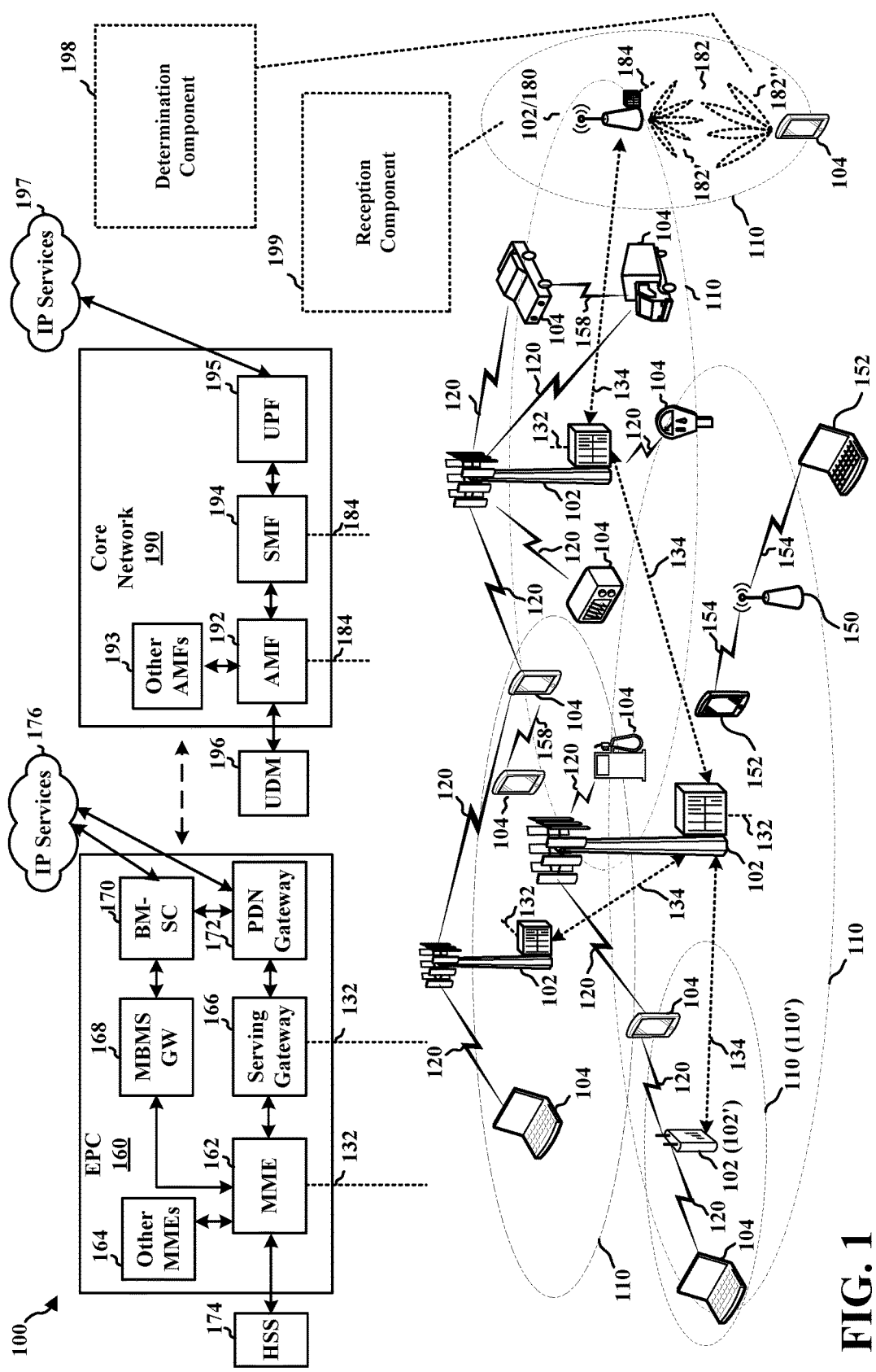
FIG. 1 is a diagram illustrating an example of a wireless communications system and an access network.

A user equipment (UE) and/or a base station may communicate in a full duplex mode in which uplink communication and downlink communication is exchanged in a same frequency band at overlapping times. The UE and the base station may exchange communication using one or more directional beams. A beam between the UE and the base station may become blocked, which may lead to downlink and/or uplink beam degradation leading to a beam failure. A UE or a base station operating in a full duplex mode may experience self-interference for a beam that leads to a beam failure for downlink communication.

The UE may use a Beam Failure Detection (BFD) procedure to identify problems in beam quality and may use a beam failure recovery (BFR) procedure when a beam failure is detected. For monitoring active link performances, a UE may perform measurements of at least one signal, e.g., reference signals, for beam failure detection.

When a beam failure is detected, a UE may take appropriate actions to recover the connection. For example, after multiple out-of-sync measurements, the UE may transmit a beam failure recovery signal, e.g., a BFRQ to initiate recovery of the connection with the base station. For example, the UE may receive an RRC configuration from the base station with parameters for a beam failure recovery procedure that the UE may use to indicate to the base station that the beam failure has been detected. The base station and the UE may communicate over active data/control beams both for DL communication and UL communication. The base station and/or UE may switch to a new beam direction using beam failure recovery procedures.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as an SCell.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, the UE 104 may include a determination component 198 configured to detect a beam failure for at least one active downlink and uplink beam pair for full duplex communication with an SCell, and to determine uplink resources for transmitting a BFRQ for the SCell to a base station based on a layer 1 signal to interference and noise ratio (L1-SINR) measurement for the at least one active downlink and uplink beam pair of the SCell. The determination component 198 may also be configured to transmit the BFRQ to the base station using the determined uplink resources if the L1-SINR measurement for the at least one active downlink and uplink beam pair of the SCell falls below a quality threshold a number of times. The base station 102 or 180 may include a reception component 199 configured to serve as an SCell for full duplex communication with a UE configured with at least one active downlink and uplink beam pair, and to receive a BFRQ from the UE indicating a beam failure for at least one active downlink and uplink beam pair for the SCell due to self-interference. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
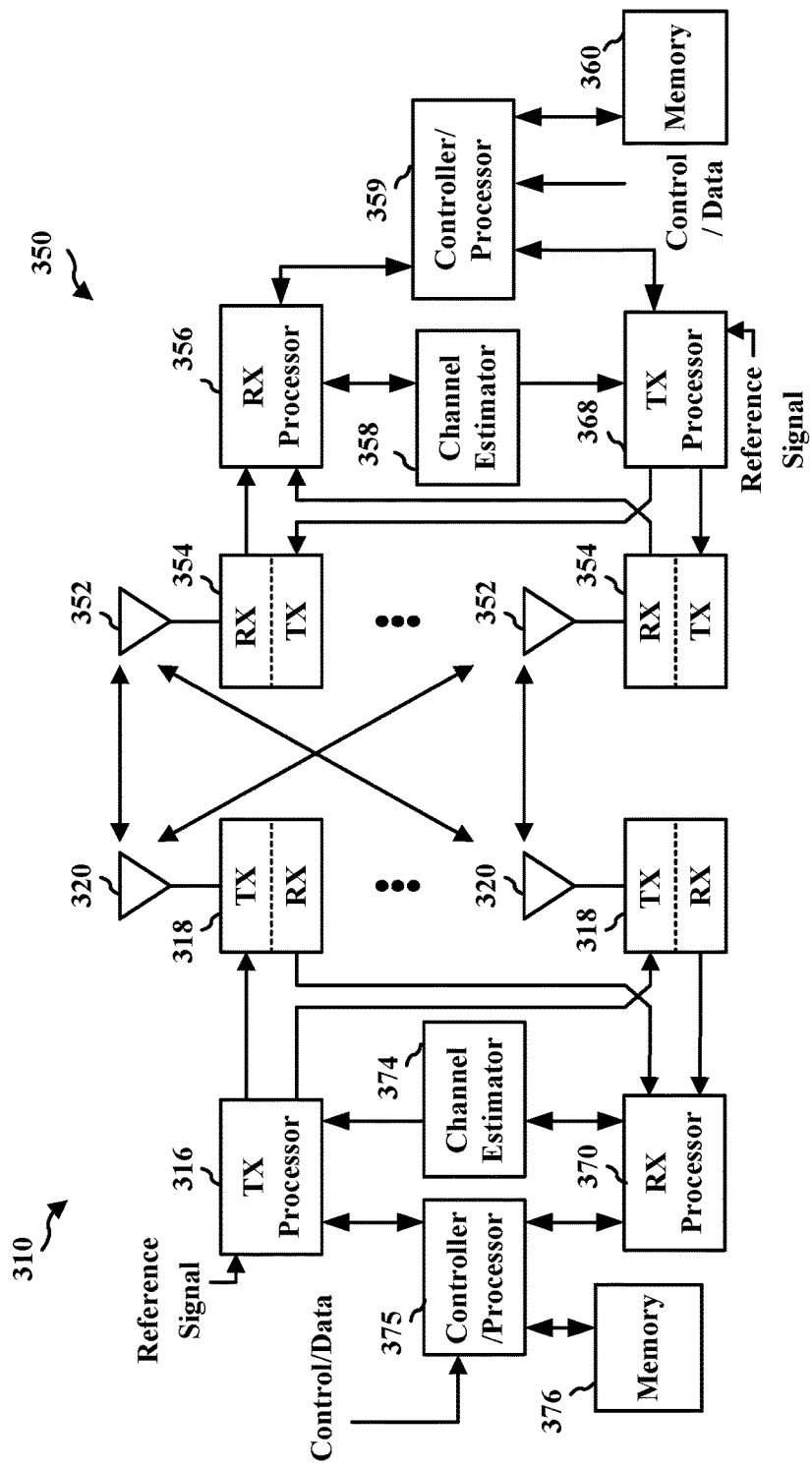
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the determination component 198 of FIG. 1.

At least one of the TX processor 316, the RX processor 370, and the controller/processor 375 may be configured to perform aspects in connection with the reception component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 5:
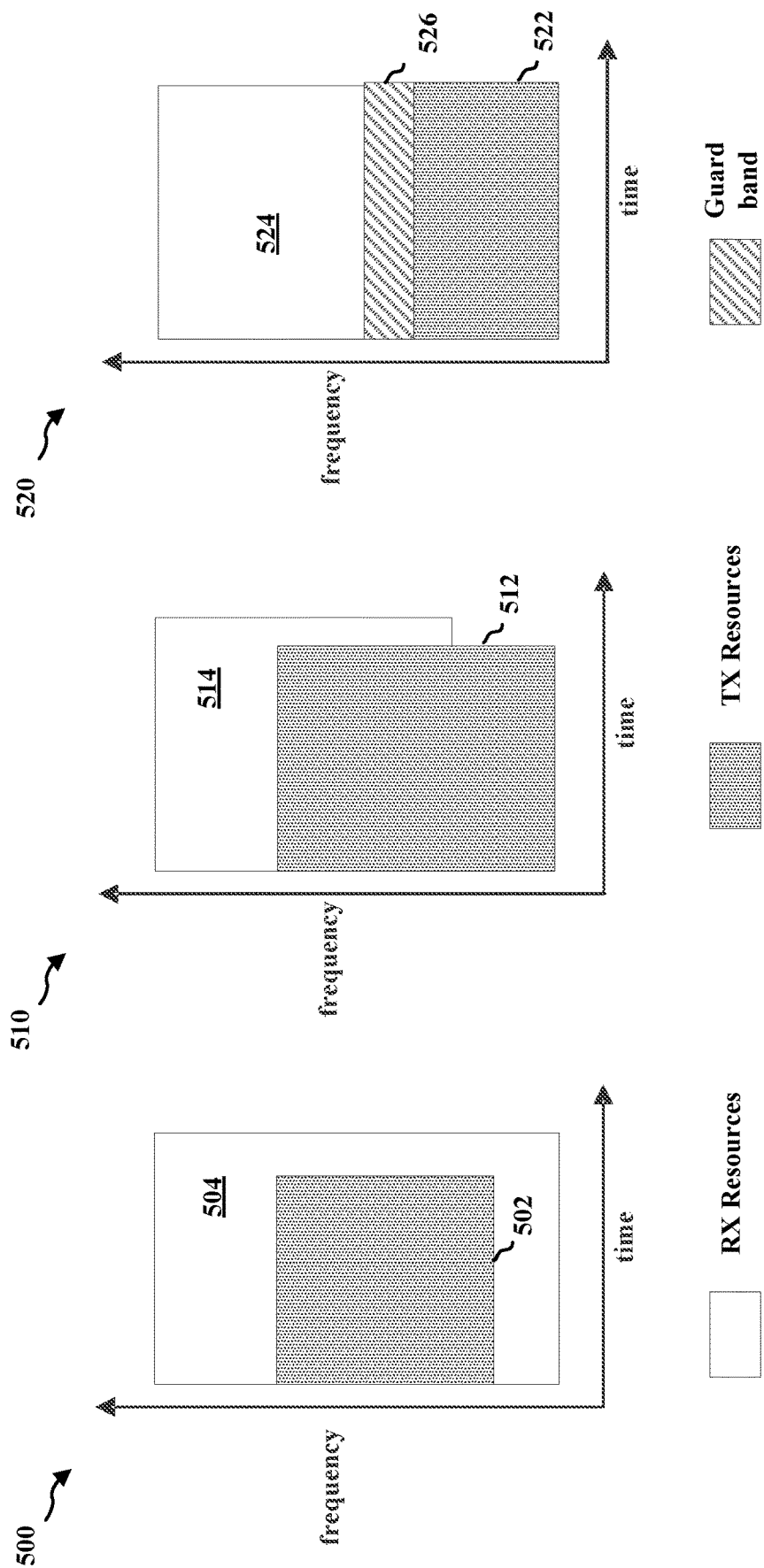
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

As described in connection with FIG. 1, a UE 104 and a base station 102 or 180 may use beamforming 182 to exchange downlink and uplink communication using directional beams. After determination of a beam for communication, conditions may change and may cause a beam to fail. For example, a UE may experience a beam failure if a user moves to a location that blocks the beam to the base station. For example, the UE may move to a different orientation, may move around a corner, or may move to a location in which a building or other structure blocks the beam. In other examples, the surrounding environment may change, e.g., a vehicle may move to a position that blocks the beam between the UE and the base station. If the current beam used by the UE becomes unreliable, the UE may switch to a new beam. The UE may monitor the quality of the beam and may perform radio link monitoring (RLM) in order to detect a reduction in the beam quality.

For example, a UE may monitor a quality of a signal received via reception beam(s). Measurements for RLM, e.g., of downlink signals, may be performed by a physical (PHY) layer of the UE based on one or more RLM reference signals. The PHY layer may pass the RLM measurements to a medium access control (MAC) layer and radio resource control (RRC) layer. The RRC layer may be responsible for detecting a radio link failure (RLF), and the MAC layer may be responsible for detecting beam failures.

The UE may use a BFD procedure to identify problems in beam quality and may use a beam failure recovery (BFR) procedure when a beam failure is detected. For monitoring active link performances, a UE may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE may determine a configured metric such as block error rate (BLER) for a reference signal. The measurement(s) may indicate the UE's ability to transmit an uplink transmission to the base station using the beam.

Thresholds may be defined in tracking the radio link conditions, the threshold(s) may correspond to an RSRP, a BLER, etc. that indicates an in-sync condition and/or an out-of-sync condition of the radio link. For example, a threshold, which may be referred to as Qout_LR, may be used by the PHY layer to trigger a failure indication to the MAC layer. For example, a beam failure instance may be determined if the monitored RLM reference signal(s) fall below the Qout_LR threshold, e.g., if all of the monitored RLM reference signals fall below Qout_LR. The MAC layer may use the indications of the beam failure instances in combination with a count threshold and/or timer to determine a beam failure. For example, the MAC layer may detect and compare a number of beam failure instances to a beam failure instance maximum count threshold within a time based on a beam failure detection timer to determine that a beam failure has occurred.

An "out-of-sync" condition may indicate that the radio link condition is poor, and an "in-sync" condition may indicate that the radio link condition is acceptable, and the base station is likely to receive a transmission transmitted on the radio link. An Out-of-Sync condition may be declared when a block error rate for the radio link falls below a threshold over a specified time interval. An in-sync condition may be declared when a block error rate for the radio link is better than a threshold over a specified time interval. If the UE receives a threshold number of consecutive out-of-sync measurements over a period of time, the UE may declare a beam failure.

When a beam failure is detected, a UE may take appropriate actions to recover the connection. For example, after multiple out-of-sync measurements, the UE may transmit a beam failure recovery signal, e.g., a BFRQ to initiate recovery of the connection with the base station. For example, the UE may receive an RRC configuration from the base station with parameters for a beam failure recovery procedure that the UE may use to indicate to the base station that the beam failure has been detected. The base station and the UE may communicate over active data/control beams both for DL communication and UL communication. The base station and/or UE may switch to a new beam direction using beam failure recovery procedures.

The UE may attempt to perform beam failure recovery by initiating a random access procedure (e.g., a contention free random access (CFRA) procedure with a configured beam failure recovery information element (BFR IE)).

Figure 6:
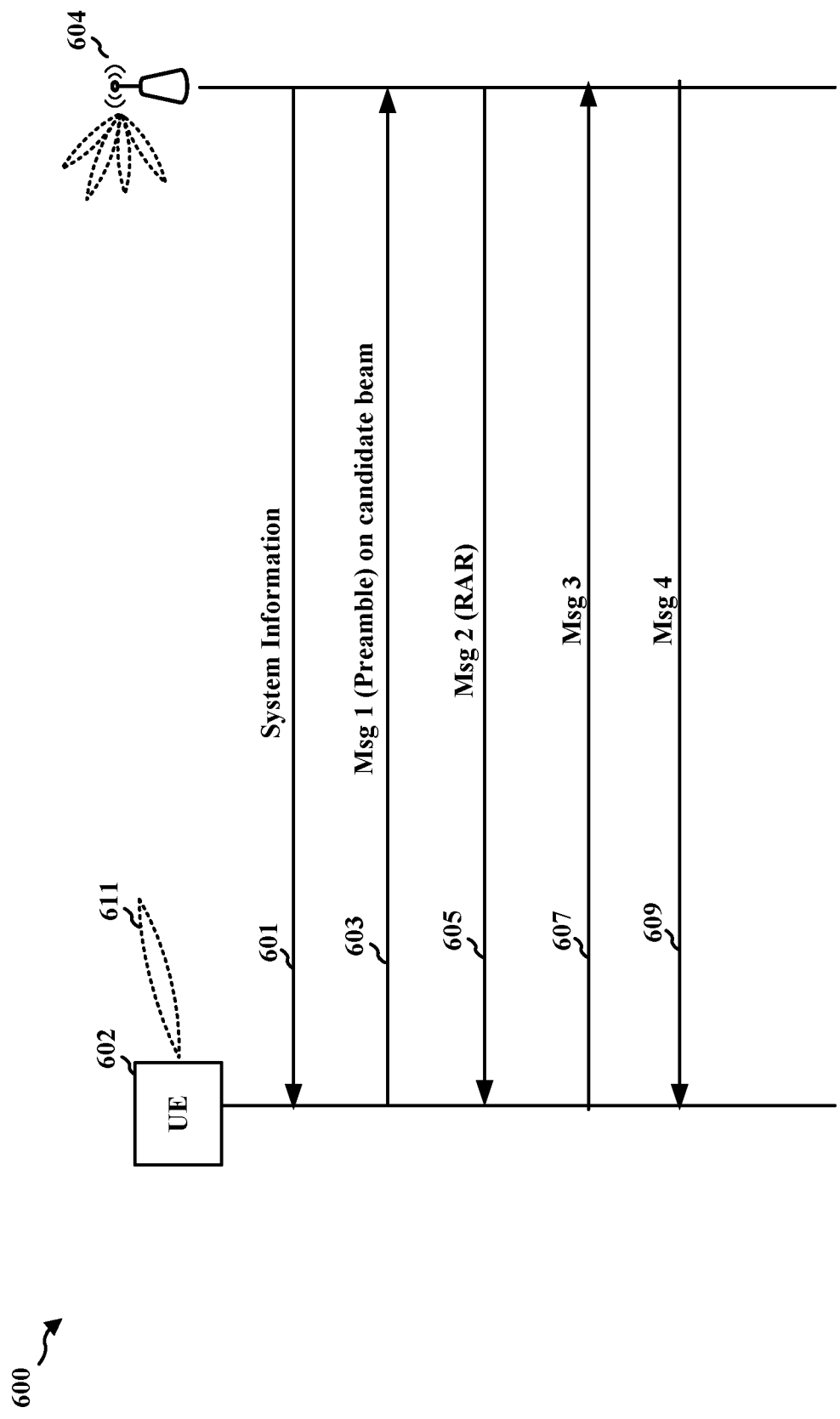
FIG. 6 illustrates an example random access channel (RACH) procedure for beam failure recovery.

FIG. 6 illustrates an example beam failure recovery random access channel (RACH) procedure 600 between a UE 602 and a base station 604. Before transmitting a random access preamble in Msg 1 603, the UE may identify a new target beam, e.g., beam 611, for communication with the base station based on RSRP measurements of one or more candidate beams. The UE may use the selected beam 611 to perform the RACH procedure for the beam failure recovery.

A UE may use Contention Based Random Access (CBRA) may be performed when a UE is not synchronized with a base station, and the CFRA may be applied, e.g., as the UE 602 was previously synchronized to a base station 604. Both the procedures include transmission of a random access preamble from the UE to the base station. In CBRA, a UE may randomly select a random access preamble sequence, e.g., from a set of preamble sequences. As the UE randomly selects the preamble sequence, the base station may receive another preamble from a different UE at the same time. Thus, CBRA provides for the base station to resolve such contention among multiple UEs. In CFRA, the network may allocate a preamble sequence to the UE rather than the UE randomly selecting a preamble sequence. This may help to avoid potential collisions with a preamble from another UE using the same sequence. Thus, CFRA is referred to as "contention free" random access.

The UE 602 may initiate the random access message exchange for beam failure recovery by sending, to the base station 604, a first random access message 603 (e.g., Msg 1) including a preamble and an indication that the first random access message 603 is for beam failure recovery using the selected candidate beam 611. Prior to sending the first random access message 603, the UE may obtain random access parameters, e.g., including preamble format parameters, time and frequency resources, parameters for determining root sequences and/or cyclic shifts for a random access preamble, etc., e.g., in system information 601 from the base station 604, in some examples. A RACH procedure based on system information 601 may be referred to as a system information RACH procedure. The preamble may be transmitted with an identifier, such as a Random Access RNTI (RA-RNTI). The UE may monitor for a response from the base station during a random access response window.

The base station responds to the first random access message 603 by sending a second random access message 605 (e.g. Msg 2) using PDCCH and including a random access response (RAR). The RAR may include, e.g., an identifier of the random access preamble sent by the UE, a time advance (TA), an uplink grant for the UE to transmit data, cell radio network temporary identifier (C-RNTI) or another identifier, and/or a back-off indicator. The RACH procedure for beam failure recovery enables the UE and base station to establish communication using a new beam to replace the beam with the detected beam failure.

In some examples, upon receiving the RAR (e.g., 605), the UE 602 may transmit a third random access message 607 (e.g., Msg 3) to the base station 604, e.g., using PUSCH, that may include a RRC connection request, an RRC connection re-establishment request, or an RRC connection resume request, depending on the trigger for the initiating the random access procedure. The base station 604 may then complete the random access procedure by sending a fourth random access message 609 (e.g., Msg 4) to the UE 602, e.g., using PDCCH for scheduling and PDSCH for the message. The fourth random access message 609 may include a random access response message that includes timing advancement information, contention resolution information, and/or RRC connection setup information. The UE 602 may monitor for PDCCH, e.g., with the C-RNTI. If the PDCCH is successfully decoded, the UE 602 may also decode PDSCH. The UE 602 may send HARQ feedback for any data carried in the fourth random access message.

If two UEs transmit a same preamble at 603, e.g., in CBRA, both UEs may receive the RAR leading both UEs to send a third random access message 607. The base station 604 may resolve such a collision by being able to decode the third random access message from only one of the UEs and responding with a fourth random access message to that UE. The other UE, which did not receive the fourth random access message 609, may determine that random access did not succeed and may re-attempt random access. Thus, the fourth message may be referred to as a contention resolution message. The fourth random access message 609 may complete the random access procedure. Thus, the UE 602 may then transmit uplink communication and/or receive downlink communication with the base station 604 based on the RAR (e.g., 605).

Figure 7:
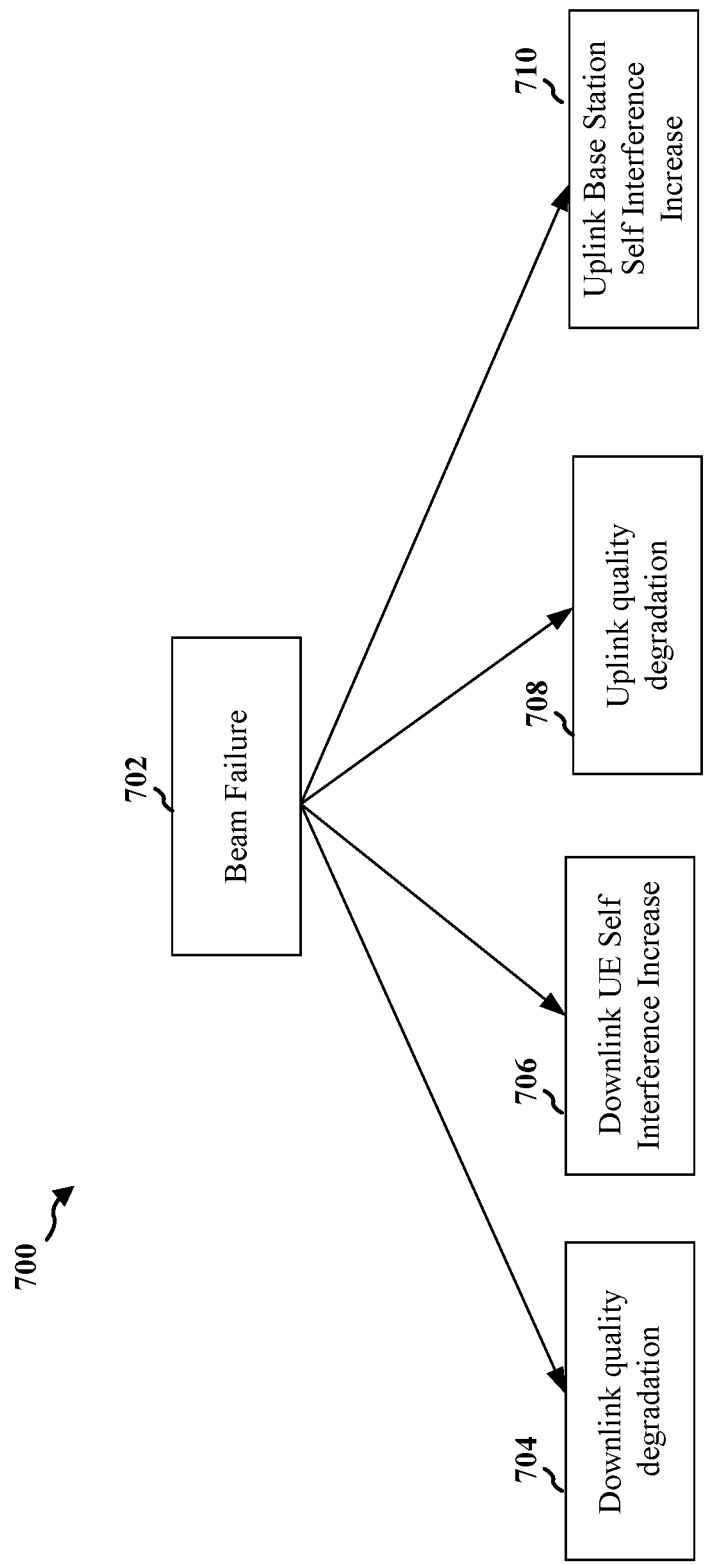
FIG. 7 illustrates examples of categories leading to beam failure.

Beam failure may occur for any of various reasons. FIG. 7 illustrates a diagram 700 of example reasons that may cause a beam failure 702. In some aspects, the beam failure may be based on downlink quality degradation 704 and/or uplink quality degradation 708. As an example, the downlink and/or uplink beam may quality may degrade based on a blocked beam between the UE and the base station. In some aspects, the beam failure 702 may be caused by an increase in self-interference at a UE, as shown at 706. For example, a UE may receive at least a portion of the UE's own uplink transmission, such as the UE 404b in FIG. 4B, that causes an increased amount of self-interference in downlink reception at the UE. In some aspects, the increase in self-interference may be due to a dynamic clutter or a reflecting object in a changing environment of the UE that reflects the uplink transmission back to the UE. In some aspects, the beam failure 702 may be caused by an increase in self-interference at a base station, as shown at 710. For example, a base station, such as the base station 402a in FIG. 4A, may receive at least a portion of the base station's own downlink transmission leading to an increased amount of self-interference in uplink reception at the base station. In some aspects, the increased self-interference at the base station may be due to increased reflection of a downlink signal to the UE 404a that interferes with uplink reception at the base station of the uplink signal from the UE 406a.

Aspects presented herein provide improved detection and signaling relating to beam failure detection due to self-interference as well as other interferences based on one or more signals emitted from another UE and/or another base station in proximity to the UE.

When a beam failure is detected, a UE may take appropriate actions to recover the connection, e.g., as described in connection with FIGS. 6 and/or 7. For example, after multiple out-of-sync measurements, the UE may transmit a beam failure recovery signal, e.g., a BFRQ, to initiate recovery of the connection with the base station. For example, the UE may receive an RRC configuration from the base station with parameters for a beam failure recovery procedure that the UE may use to indicate to the base station that the beam failure has been detected. The base station and the UE may communicate over active data/control beams both for DL communication and UL communication. The base station and/or UE may switch to a new beam direction using beam failure recovery procedures.

Figure 8:
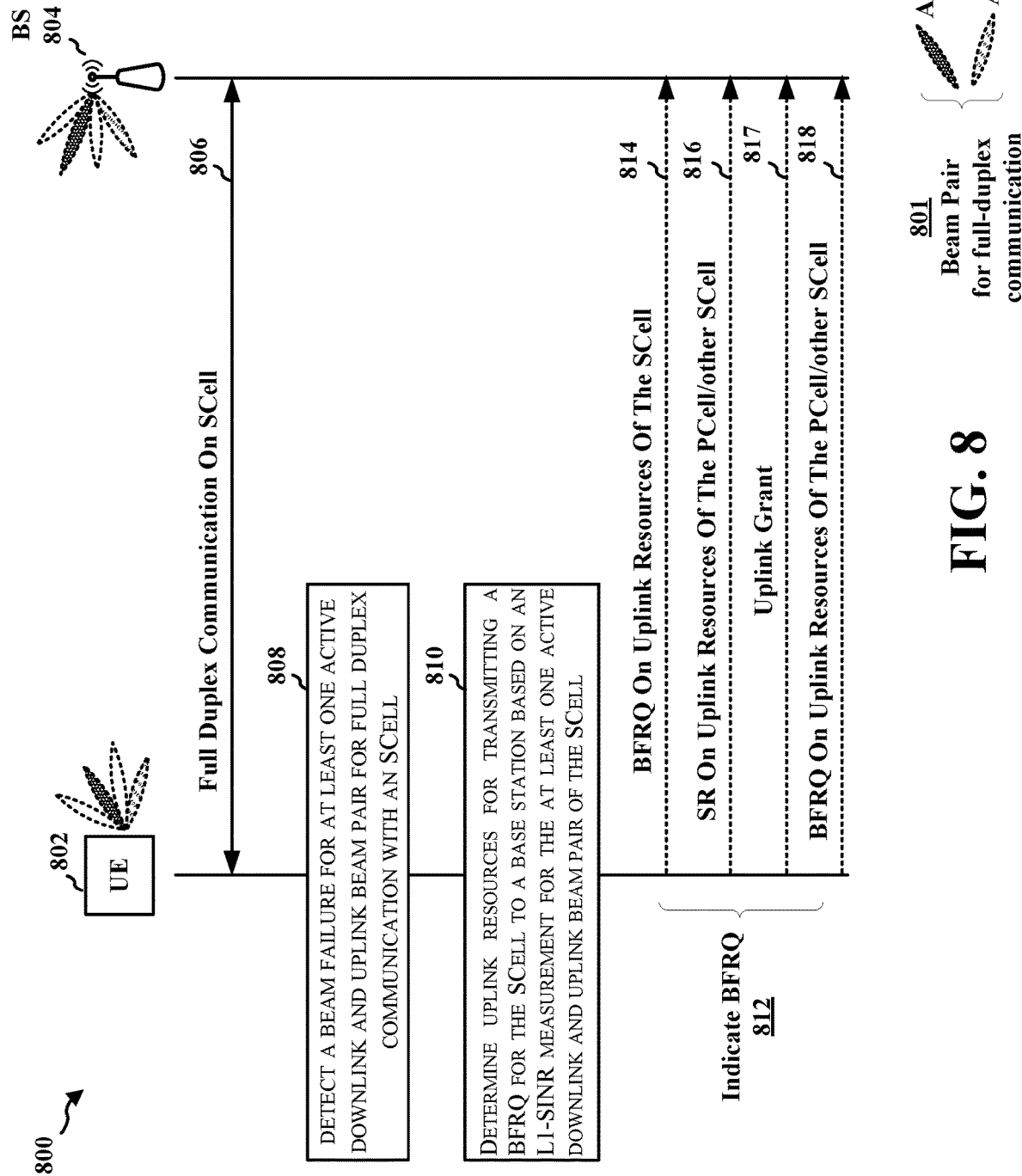
FIG. 8 illustrates an example communication flow between a UE and a base station that may detect a beam failure for full duplex communication with an SCell and determine uplink resources for transmitting a BFRQ for the SCell to a base station in accordance with aspects of the disclosure.

FIG. 8 illustrates an example communication flow 800 between a UE 802 and a base station 804 that may detect a beam failure for full duplex communication with an SCell and determine uplink resources for transmitting a BFRQ for the SCell to a base station, in accordance with aspects of the disclosure. The UE 802 may correspond to the UE 104 in FIG. 1, the UE 350 in FIG. 3, any of the UEs 404a, 404b, 404c, 406a, 406b, or 406c in FIG. 4A, 4B, or 4C, or the UE 602 in FIG. 6. The base station 804 may correspond to the base station 102 or 180 in FIG. 1, the base station 310 in FIG. 3, any of the base stations 402a, 402b, 402c, 408a, 408b, or 408c in FIG. 4A, 4B, or 4C, or the base station 604 in FIG. 6. The base station 804 may serve as the SCell for full duplex communication with the UE 802 configured with the at least one active downlink and uplink beam pair.

In FIG. 8, the UE 802 and the base station 804 may use beamforming with at least one active downlink and uplink beam pair for full duplex communication 806 for an SCell for the UE 802. The full duplex beam pair for the SCell includes an active uplink beam and an active downlink beam, as shown in the example beam pair 801. The base station 804 will use a corresponding beam pair for downlink and uplink communication with the UE 802. The UE 802 and the base station 804 may coordinate the beam pair of the active uplink beam and the active downlink beam for the full duplex communication. In some aspects, the beam pair may be based on measurements, e.g., including self-interference measurements, performed by the UE 802. In some aspects, the UE 802 may report the measurements to the base station 804. After determination of a beam pair for communication, conditions may change and may cause a beam to fail. The UE 802 may detect, at 808, a beam failure for at least one active downlink and uplink beam pair for full duplex communication with an SCell. The beam failure may be detected at the SCell's MAC layer.

In response to the beam failure, the UE 802 may provide an indication to the base station 804 in order to initiate a beam failure recovery with the base station 804. For example, the UE 802 may transmit a BFRQ for the SCell to the base station. The UE 802 may determine, as illustrated at 810, uplink resources for transmitting the BFRQ for the SCell to the base station 804 based on an L1-SINR measurement for the at least one active downlink and uplink beam pair of the SCell.

In some examples, the uplink resources for the UE 802 may still be working. For example, the beam failure of a downlink beam may be due to self-interference based on uplink transmission on the uplink beam. The uplink beam would not experience the same self-interference, and the base station may continue to receive communication from the UE on the uplink beam. In contrast, if the beam failure is due to link degradation, the uplink beam may have degraded performance along with degraded performance of a downlink beam. As an example, if the UE 802 detects the beam failure the SCell MAC layer for full duplex communication, e.g., due to self-interference on the downlink beam, and the uplink beam is still working, e.g., meets a quality threshold or other criteria for uplink communication, the UE 802 may transmit the BFRQ to the base station 804 via UCI or PUSCH (e.g., a MAC-CE) of the SCell, e.g., as illustrated at 814. If the active uplink beam of the SCell is not working, e.g., has link quality degradation, the UE 802 may send a scheduling request (SR) 816 to the base station 804 in uplink resources of the PCell or a different SCell. For example, the UE 802 may transmit the SR on a PUCCH, or UCI on PUSCH, in the uplink resources of the PCell or the different SCell. The SR 816 may indicate a request for the base station to provide an uplink grant 817, e.g., DCI format 0, so that the UE 802 can transmit the BFRQ 818 to the base station 804.

After determining the uplink resource to use to transmit the BFRQ, the UE 802 may then transmit the BFRQ 812 to the base station 804 using the determined uplink resources, e.g., if the L1-SINR measurement for the at least one active downlink and uplink beam pair of the SCell falls below a quality threshold a number of times.

In some aspects, the number of times the L1-SINR measurement may fall below the quality threshold for at least a maximum count for beam failure instances. In one aspect, the base station 804 may receive the BFRQ 812 from the UE 802 indicating the beam failure for the at least one active downlink and uplink beam pair for the SCell due to the self-interference.

In some aspects, the UE 802 may detect the beam failure for the at least one active downlink and uplink beam pair due to link degradation and/or self-interference. In one aspect, if the L1-SINR measurement for the at least one active downlink and uplink beam pair falls below the quality threshold, the UE 802 may transmit to the base station 804 a scheduling request via a different cell for the uplink resources to send the BFRQ 812 for the SCell. In this case, the SCell's uplink resources for the UE 802 may not be working, e.g., the uplink beam may be failing, e.g., due to a link degradation. In one aspect, the different cell may include a primary cell (PCell). In another aspect, the different cell may include a different SCell, e.g., an SCell having an uplink beam for which a beam failure is not detected. In one aspect, the L1-SINR measurement falling below the quality threshold may indicate a link degradation for at least one of an uplink beam or a downlink beam of the at least one active downlink and uplink beam pair.

In one aspect, the UE 802 may receive an uplink grant of the different cell from the base station 804 in response to the scheduling request, and may transmit to the base station 804 the BFRQ 812 for the SCell using uplink resources of the different cell indicated in the uplink grant. The uplink grant may be received, e.g., in DCI from the base station. The DCI may be based on a particular DCI format, e.g., DCI format 0. The UE 802 may transmit the BFRQ 812 to the base station 804 in one or more of: a PUCCH based on the uplink grant, UCI on a PUSCH based on the uplink grant, or the PUSCH through a medium access control-control element (MAC-CE) based on the uplink grant.

In one aspect, when the L1-SINR measurement for the at least one active downlink and uplink beam pair is above the quality threshold, the UE 802 may determine to transmit the BFRQ 812 to the base station 804 using uplink resources of the SCell. The L1-SINR measurement may indicate that the uplink beam has not experienced a beam failure and the base station may successfully receive communication on the uplink beam. The UE 802 may transmit the BFRQ 812 to the base station in at least one of: UCI of the SCell, or a PUSCH through a MAC-CE of the SCell.

Thus, at 810, the UE 802 may determine between using resources of the SCell or resources of a different cell (e.g., PCell or different SCell) to indicate the BFRQ to the base station.

The UE 802 may transmit to the base station 804 a scheduling request via a different cell for the uplink resources to send the BFRQ 812 for the SCell after transmitting one or more retransmissions of the BFRQ 812 to the base station via the UCI or the PUSCH through the MAC-CE of the SCell. When the UE transmits a maximum number of retransmissions of the BFRQ 812 to the base station via the UCI or the PUSCH through the MAC-CE of the SCell, the UE 802 may transmit the scheduling request to the base station via the uplink resources of the different cell. In one aspect, the UE 802 may transmit each of the one or more retransmissions of the BFRQ 812 after a timer expires following a prior transmission of the BFRQ 812. In one aspect, the different cell may include a PCell. In another aspect, the different cell may include a different SCell.

In one aspect, the BFRQ 812 may indicate a full failure of multiple active downlink and uplink beam pairs. The BFRQ 812 may indicate that the beam failure is due to self-interference or a link degradation. Thus, when the BFRQ 812 indicates a full failure (e.g., all monitored RLM reference signals fall below a threshold), the UE 802 may indicate that both active downlink beams failed due to the self-interference (e.g., adding 1-bit field for the beam failure report). In another aspect, the BFRQ 812 indicates the beam failure for a subset of active downlink and uplink beam pairs. The BFRQ 812 may identify a partial failure, e.g., a failure for at least one of an uplink beam or a downlink beam of the subset of active downlink and uplink beam pairs. The BFRQ 812 may indicate that the beam failure is due to self-interference or a link degradation. Thus, when the BFRQ 812 indicates a partial failure (e.g., some monitored RLM reference signals fall below a threshold), the UE 802 may indicate that one of the active downlink beams failed due to the self-interference (e.g., adding a failed beam identifier).

In response to the BFRQ 812, the base station 804 and the UE 802 may perform beam failure recovery in order to determine a new beam pair of an active uplink beam and an active downlink beam for full duplex communication.

Figure 9:
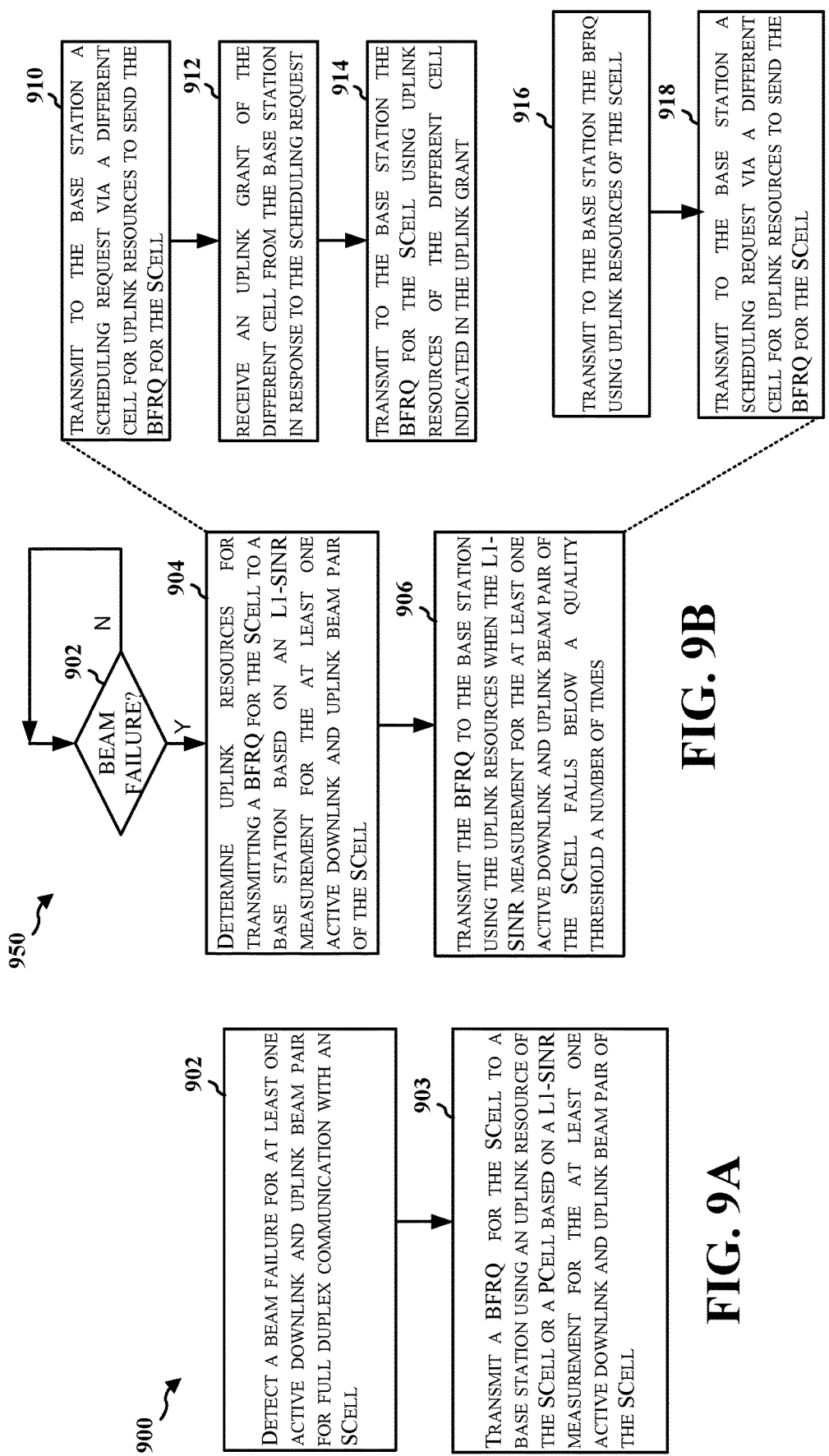
FIGS. 9A and 9B are flowcharts of methods of wireless communication performed by a UE.

FIG. 9A is a flowchart 900 of a method of wireless communication. The method may be performed by a UE (e.g., the UE 104; the apparatus 1002). The method enables the UE to take appropriate actions to recover the connection when a beam failure is detected. The method also enables the UE to transmit a beam failure recovery signal to quickly initiate recovery of the connection with the base station. Subsequently, the base station and the UE may communicate over active data/control beams both for DL communication and UL communication. The base station and/or UE may switch to a new beam direction using beam failure recovery procedures.

At 902, the UE may detect a beam failure for at least one active downlink and uplink beam pair for full duplex communication with an SCell. In one aspect, the beam failure is detected at SCell's MAC layer. In one example, 902 may be performed by a detection component 1040 in FIG. 10. Further, FIG. 8 illustrates an example of the beam failure detection 808. As shown in the example in FIG. 9B, the beam failure detection 902 may loop until a beam failure is detected.

At 903, the UE transmits a BFRQ for the SCell to a base station using an uplink resource of the SCell or a PCell based on an L1-SINR measurement for the at least one active downlink and uplink beam pair of the SCell. The transmission may be performed, e.g., by the BFRQ component 1044 of the apparatus 1002. The transmission of the BFRQ for the SCell may be on the uplink resource of the PCell, in some aspects. In other aspects, the BFRQ may be transmitted on the PCell or another SCell. The BFRQ may be transmitted, e.g., if the L1-SINR measurement for the at least one active downlink and uplink beam pair of the SCell fall below a quality threshold a number of times based on a maximum count for beam failure instances.

FIG. 9B is a flowchart of a method 950 of wireless communication. The method may be performed at a UE and may include the detection of the beam failure at 902 and the transmission of the BFRQ, e.g., similar to at 903, as described in connection with FIG. 9A.

At 904, the UE may determine uplink resources for transmitting a BFRQ for the SCell to a base station based on an L1-SINR measurement for the at least one active downlink and uplink beam pair of the SCell. The base station may serve as the SCell for full duplex communication with the UE configured with the at least one active downlink and uplink beam pair. In one example, 904 may be performed by an uplink resource determination component 1042 in FIG. 10. Further, FIG. 8 illustrates an example of the resource determination 810.

When the uplink resources for transmitting a BFRQ for the SCell has been determined, at 906, the UE may then transmit the BFRQ to the base station using the determined uplink resources when the L1-SINR measurement for the at least one active downlink and uplink beam pair of the SCell falls below a quality threshold a number of times. In this case, the uplink resources for the UE may still be working. In one aspect, the number of times the L1-SINR measurement falls below the quality threshold may be based on a maximum count for beam failure instances. In one aspect, the base station serves as an SCell for the full duplex communication with a UE and receives the BFRQ from the UE indicating the beam failure for the at least one active downlink and uplink beam pair for the SCell due to the self-interference. In one example, 906 may be performed by the BFRQ component 1044 via the transmission component 1034 in FIG. 10. Further, FIG. 8 illustrates an example of the transmission of the BFRQ 812.

The UE may determine whether the L1-SINR measurement for the at least one active downlink and uplink beam pair falls below the quality threshold. When the L1-SINR measurement falls below the quality threshold, the UE may transmit the BFRQ to the base station.

At 910, the UE may transmit to the base station a scheduling request via a different cell for the uplink resources to send the BFRQ for the SCell, when the L1-SINR measurement falls below the quality threshold. In this case, the SCell's uplink resources for the UE may not be working. In one aspect, the different cell may include a PCell. In another aspect, the different cell may include a different SCell. In one aspect, the L1-SINR measurement falling below the quality threshold indicates a link degradation for at least one of an uplink beam or a downlink beam of the at least one active downlink and uplink beam pair. In one example, 910 may be performed by a SR component 1046 in FIG. 10.

At 912, the UE may receive an uplink grant of the different cell from the base station in response to the scheduling request. In one example, 912 may be performed by a reception component 1030 in FIG. 10.

At 914, the UE may transmit to the base station the BFRQ for the SCell using uplink resources of the different cell indicated in the uplink grant. The UE may transmit the BFRQ to the base station in one or more of: a PUCCH based on the uplink grant, UCI on a PUSCH based on the uplink grant, or the PUSCH through a medium access control-control element (MAC-CE) based on the uplink grant. In one aspect, when the L1-SINR measurement for the at least one active downlink and uplink beam pair is above the quality threshold, the UE may determine to transmit the BFRQ to the base station using uplink resources of the SCell. The UE may transmit the BFRQ to the base station in at least one of: UCI of the SCell, or a PUSCH through a MAC-CE of the SCell. In one example, 914 may be performed by the BFRQ component 1044 via the transmission component 1034 in FIG. 10.

At 916, the UE transmits to the base station the BFRQ using uplink resources of the SCell, if the L1-SINR measurement made at 908 for the at least one active downlink and uplink beam pair is above the quality threshold. In one example, 916 may be performed by the BFRQ component 1044 via the transmission component 1034 in FIG. 10.

At 918, the UE may transmit to the base station a scheduling request via a different cell for the uplink resources to send the BFRQ for the SCell after transmitting one or more retransmissions of the BFRQ to the base station via the UCI or the PUSCH through the MAC-CE of the SCell. When the UE transmits a maximum number of retransmissions of the BFRQ to the base station via the UCI or the PUSCH through the MAC-CE of the SCell, the UE may transmit the scheduling request to the base station via the uplink resources of the different cell. In one aspect, the UE may transmit each of the one or more retransmissions of the BFRQ after a timer expires following a prior transmission of the BFRQ. In one aspect, the different cell may include a PCell. In another aspect, the different cell may include a different SCell. In one aspect, the BFRQ indicates a full failure of multiple active downlink and uplink beam pairs. The BFRQ may indicate that the beam failure is due to self-interference or a link degradation. Thus, when the BFRQ indicates a full failure (e.g., all monitored RLM reference signals fall below a threshold), the UE may indicate that both active downlink beams failed due to the self-interference (e.g., adding 1-bit field for the beam failure report). In another aspect, the BFRQ indicates the beam failure for a subset of active downlink and uplink beam pairs. The BFRQ may identify a failure for at least one of an uplink beam or a downlink beam of the subset of active downlink and uplink beam pairs. The BFRQ may indicate that the beam failure is due to self-interference or a link degradation. Thus, when the BFRQ indicates a partial failure (e.g., some monitored RLM reference signals fall below a threshold), the UE may indicate that one of the active downlink beams failed due to the self-interference (e.g., adding a failed beam identifier). In one example, 916 may be performed by the SR component 1046 in FIG. 10.

Figure 10:
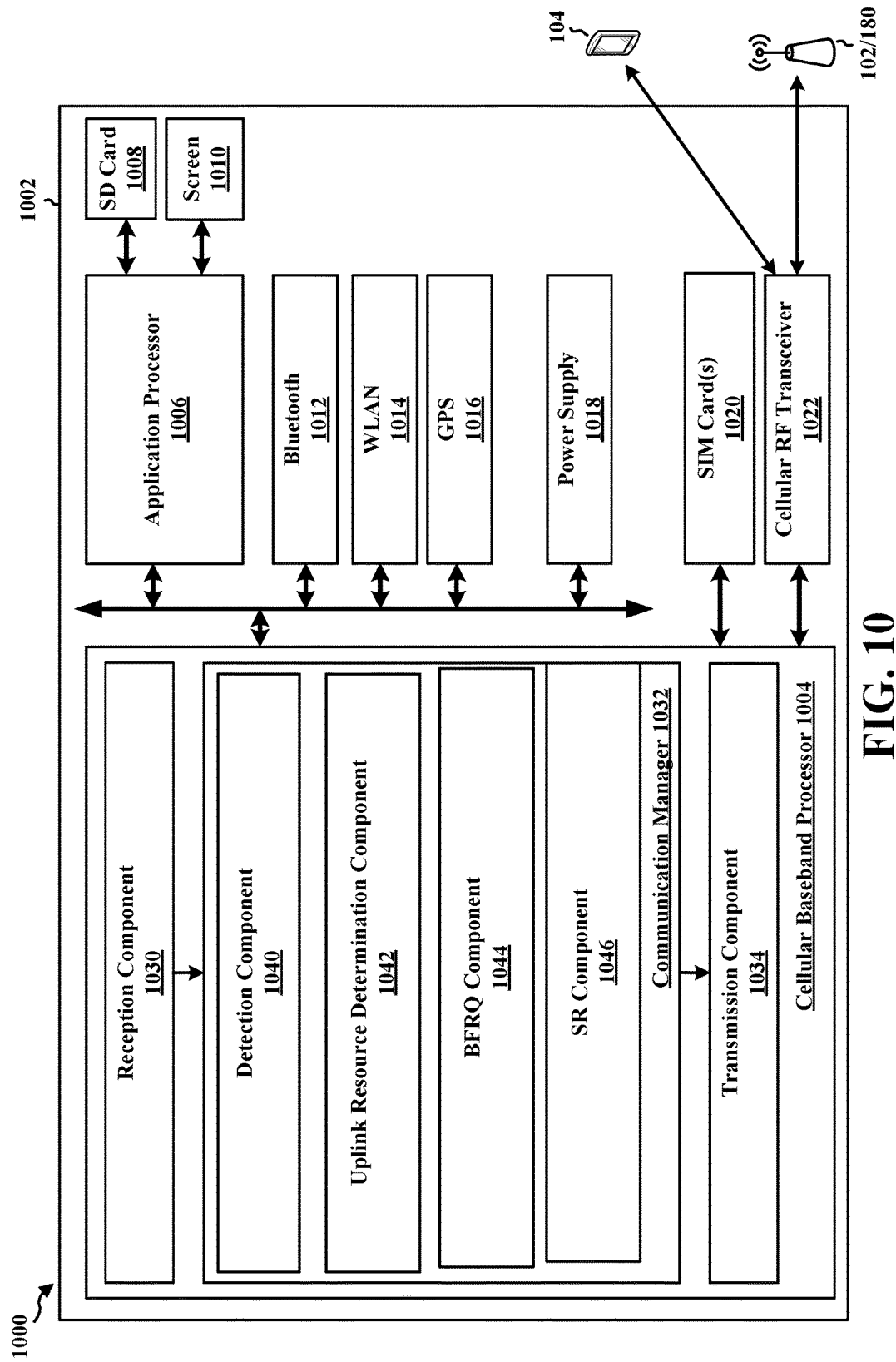
FIG. 10 is a diagram illustrating an example of a hardware implementation for an example UE apparatus.

FIG. 10 is a diagram 1000 illustrating an example of a hardware implementation for an apparatus 1002. The apparatus 1002 may be a UE, a component of a UE, or more implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the additional modules of the apparatus 1002.

The communication manager 1032 includes a detection component 1040 that is configured to detect a beam failure for at least one active downlink and uplink beam pair for full duplex communication with an SCell, e.g., as described in connection with 902 in FIG. 9A or 9B. The communication manager 1032 further includes an uplink resource determination component 1042 that is configured to receive input in the form of an L1-SINR measurement for the at least one active downlink and uplink beam pair of the SCell from the detection component 1040 and is configured to determine uplink resources for transmitting a BFRQ for the SCell to a base station, e.g., as described in connection with 904 in FIG. 9B.

The BFRQ component 1044 is configured to transmit the BFRQ to the base station using the uplink resources, e.g., as described in connection with 903, 904, 914, or 918 in FIG. 9A or 9B. The apparatus 1002 may include an SR component 1046 that is also configured to transmit to the base station a scheduling request via a different cell for the uplink resources to send the BFRQ for the SCell, when the L1-SINR measurement falls below the quality threshold, e.g., as in 910 in FIG. 9B. The reception component 1030 is then configured to receive an uplink grant of the different cell from the base station in response to the scheduling request, e.g., as in 912 in FIG. 9B. The BFRQ component 1044 may further be configured to transmit to the base station the BFRQ for the SCell using uplink resources of the different cell indicated in the uplink grant, e.g., as in 914 in FIG. 9B. The SR component 1046 may be further configured to transmit to the base station a scheduling request via a different cell for the uplink resources to send the BFRQ for the SCell after transmitting one or more retransmissions of the BFRQ to the base station via the UCI or the PUSCH through the MAC-CE of the SCell.

The apparatus 1002 may include additional components that perform each of the blocks of the algorithm in the flowcharts of FIG. 9A, 9B, and/or the aspects performed by the UE in FIG. 6 or FIG. 8. As such, each block in the flowcharts of FIG. 9A, 9B, and/or the aspects performed by the UE in FIG. 6 or FIG. 8. may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, may include: means for detecting a beam failure for at least one active downlink beam for full duplex communication with an SCell; means for determining uplink resources for transmitting a BFRQ for the SCell to a base station based on an L1-SINR measurement for the at least one active downlink and uplink beam pair of the SCell; and means for transmitting the BFRQ to the base station using the determined uplink resources if the L1-SINR measurement for the at least one active downlink and uplink beam pair of the SCell falls below a quality threshold a number of times. The apparatus 1002 may also include: means for transmitting the BFRQ to the base station using the determined uplink resources when the L1-SINR measurement for the at least one active downlink and uplink beam pair of the SCell falls below a quality threshold a number of times; means for transmitting to the base station a scheduling request via a different cell for the uplink resources to send the BFRQ for the SCell, when the L1-SINR measurement falls below the quality threshold; means for receiving an uplink grant of the different cell from the base station in response to the scheduling request; means for transmitting to the base station the BFRQ for the SCell using uplink resources of the different cell indicated in the uplink grant; and means for transmitting to the base station a scheduling request via a different cell for the uplink resources to send the BFRQ for the SCell after transmitting one or more retransmissions of the BFRQ to the base station via the UCI or the PUSCH through the MAC-CE of the SCell.

The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
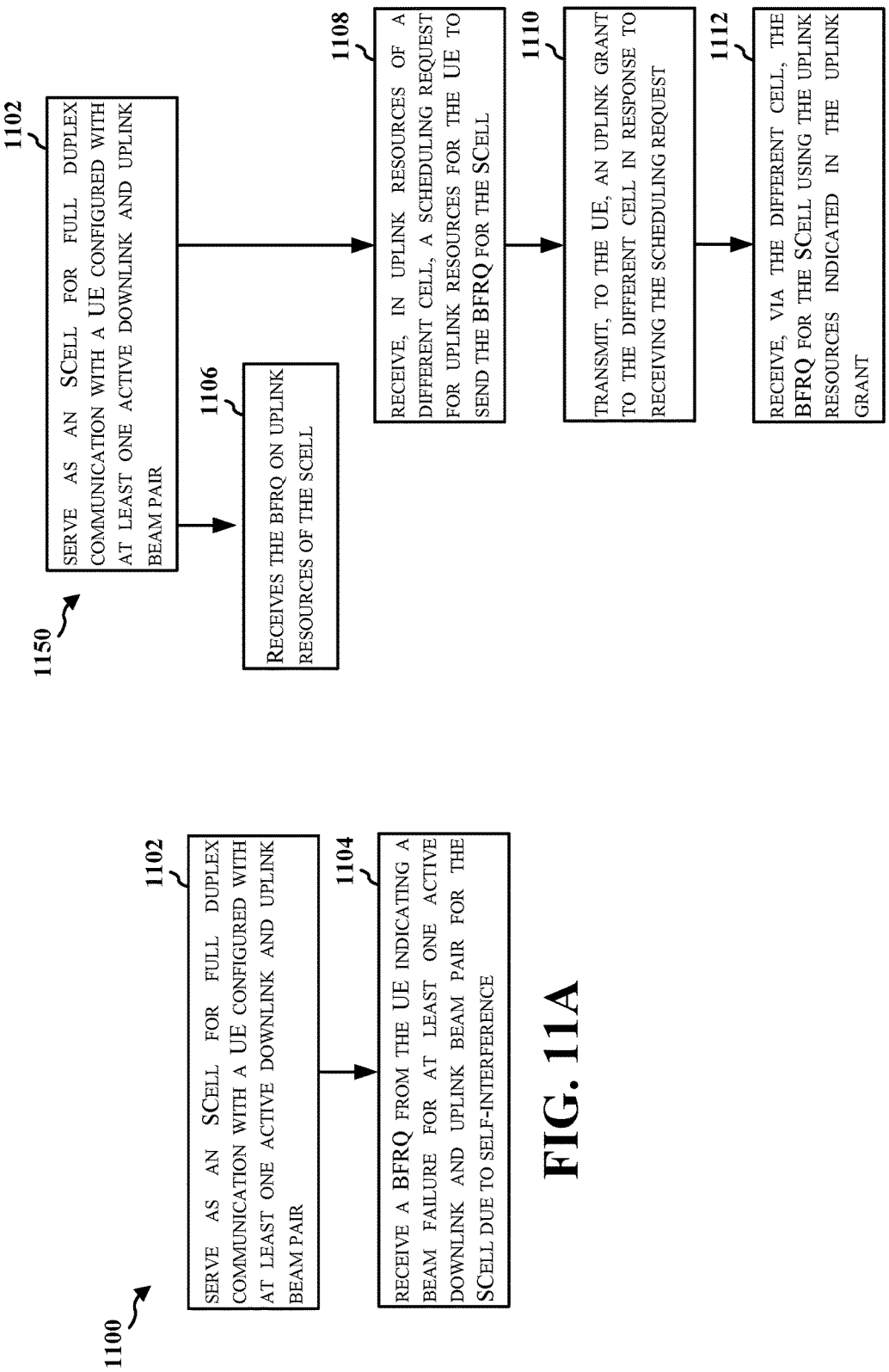
FIGS. 11A and 11B are flowcharts of methods of wireless communication performed by a base station.

FIG. 11A is a flowchart of a method 1100 of wireless communication. The method may be performed by a base station (e.g., the base station 102/180; the apparatus 1202. In some aspects, the method may be performed by the apparatus 1202 in FIG. 12, which includes memory and at least one processor, the apparatus including one or more components configured to perform the aspects of the method 1100. The method enables the base station to take appropriate actions to recover the connection when a beam failure recovery request is received from the UE. The method also enables the base station to quickly transmit, to the UE, an uplink grant to the different cell in response to receiving the scheduling request. Subsequently, the base station and the UE may communicate over active data/control beams both for DL communication and UL communication. The base station and/or UE may switch to a new beam direction using beam failure recovery procedures.

At 1102, the base station may serve as an SCell for full duplex communication with a UE configured with at least one active downlink and uplink beam pair. In one example, 1102 may be performed by an SCell component 1240 in FIG. 12. Further, FIG. 8 illustrates an example of the full duplex communication 806.

At 1104, the base station may receive a BFRQ from the UE indicating a beam failure for at least one active downlink and uplink beam pair for the SCell due to self-interference. In one example, 1104 may be performed by a BFRQ component 1242 via a reception component 1230 in FIG. 12. Further, FIG. 8 illustrates an example of the receipt of the BFRQ 812. The BFRQ may initiate a beam failure recovery to determine a new beam pair for full duplex communication, in some aspects.

FIG. 11B is a flowchart of a method 1150 of wireless communication. The method may be performed at a base station and may include service as an SCell for full duplex communication with a UE and reception of the BFRQ, such as described in connection with 1102 and 1104 in FIG. 11A. As an example, at 1106, the base station may receive the BFRQ on uplink resources of the SCell. In one example, 1106 may be performed by the BFRQ component 1242 via the reception component 1230 in FIG. 12. Further, FIG. 8 illustrates an example of the receipt of the BFRQ 812.

Alternatively or additionally, at 1108, the base station may receive, in uplink resources of a different cell, a scheduling request for uplink resources for the UE to send the BFRQ for the SCell. In one example, 1108 may be performed by a reception component 1230 in FIG. 12. FIG. 8 illustrates an example SR at 816.

At 1110, the base station may transmit, to the UE, an uplink grant to the different cell in response to receiving the scheduling request. In one example, 1110 may be performed by an uplink grant component 1246 via a transmission component 1234 in FIG. 12. FIG. 8 illustrates an example of an uplink grant, at 817.

At 1112, the base station may receive, via the different cell, the BFRQ for the SCell using the uplink resources indicated in the uplink grant. In one example, 1112 may be performed by a reception component 1230 in FIG. 12. FIG. 8 illustrates an example of the BFRQ, at 818.

Figure 12:
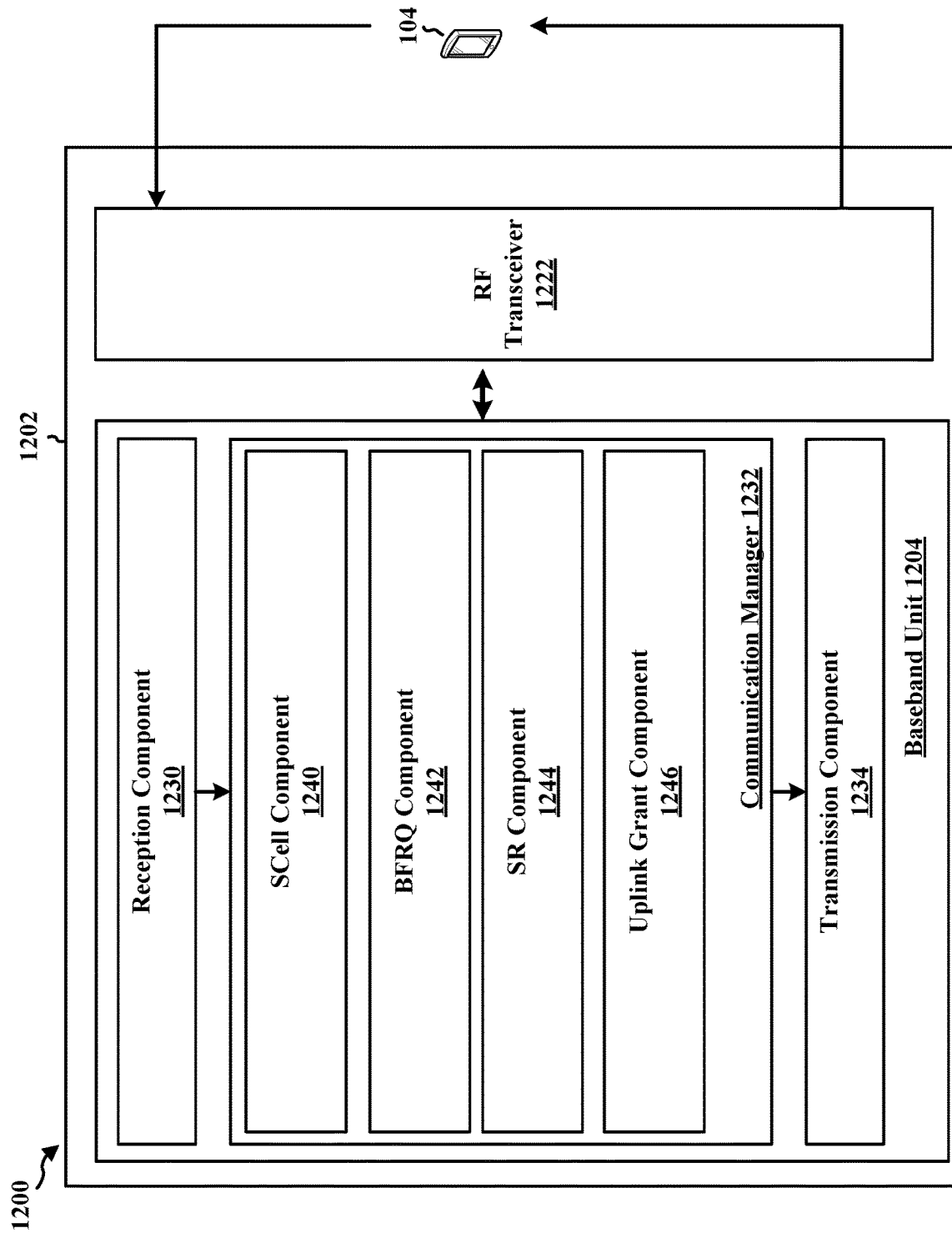
FIG. 12 is a diagram illustrating an example of a hardware implementation for a base station apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an SCell component 1240 that is configured to serve as an SCell for full duplex communication with a UE configured with at least one active downlink and uplink beam pair, e.g., as described in connection with 1102 in FIG. 11A.

The BFRQ component 1242 is configured to receive a BFRQ from the UE indicating a beam failure for at least one active downlink and uplink beam pair for the SCell due to self-interference, e.g., as described in connection with 1104 in FIG. 11A, and/or 1106 or 1112 in FIG. 11B. The apparatus 1202 may further include an SR component 1244 configured to receive, in uplink resources of a different cell, a scheduling request for uplink resources for the UE to send the BFRQ for the SCell, e.g., as described in connection with 1108 in FIG. 11B. The apparatus 1202 may further include an uplink grant component 1246 configured to transmit, to the UE, an uplink grant to the different cell in response to receiving the scheduling request. The reception component 1230 is further configured to receive, via the different cell, the BFRQ for the SCell using the uplink resources indicated in the uplink grant.

The apparatus may include additional components that perform each of the blocks of the algorithm in the flowcharts of FIG. 11A, 11B, and/or the aspects performed by the base station in FIG. 6 or FIG. 8. As such, each block in the flowcharts of FIG. 11A, 11B, and/or the aspects performed by the base station in FIG. 6 or FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, may include: means for serving as an SCell for full duplex communication with a UE configured with at least one active downlink and uplink beam pair; and means for receiving a BFRQ from the UE indicating a beam failure for at least one active downlink and uplink beam pair for the SCell due to self-interference. The apparatus 1202 may also include: means for receiving, in uplink resources of a different cell, a scheduling request for uplink resources for the UE to send the BFRQ for the SCell; means for transmitting, to the UE, an uplink grant to the different cell in response to receiving the scheduling request; and means for receiving, via the different cell, the BFRQ for the SCell using the uplink resources indicated in the uplink grant.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: detecting a beam failure for at least one active downlink and uplink beam pair for full duplex communication with an SCell; and transmitting a BFRQ for the SCell to a base station using an uplink resource of the SCell or a PCell based on a L1-SINR measurement for the at least one active downlink and uplink beam pair of the SCell.

In aspect 2, the method of aspect 1 further includes that transmission of the BFRQ for the SCell is on the uplink resource of the PCell if the L1-SINR measurement for the at least one active downlink and uplink beam pair of the SCell fall below a quality threshold a number of times based on a maximum count for beam failure instances.

In aspect 3, the method of aspect 1 or aspect 2 further includes that the UE detects the beam failure for the at least one active downlink and uplink beam pair that is due to self-interference.

In aspect 4, the method of aspect 1 or aspect 3 further includes transmitting, to the base station, a scheduling request via a different cell for the uplink resource to send the BFRQ for the SCell based on the L1-SINR measurement for the at least one active downlink and uplink beam pair falling below a quality threshold.

In aspect 5, the method of aspect 4 further includes receiving an uplink grant of the different cell from the base station in response to the scheduling request; and transmitting, to the base station, the BFRQ for the SCell using the uplink resource of the different cell indicated in the uplink grant.

In aspect 6, the method of aspect 5 further includes that the UE transmits the BFRQ to the base station in one or more of: a PUCCH based on the uplink grant, uplink control information UCI on a PUSCH based on the uplink grant, or the PUSCH through a MAC-CE based on the uplink grant.

In aspect 7, the method of any of aspects 4-6 further includes that the different cell includes the PCell.

In aspect 8, the method of any of aspects 4-6 further includes that the different cell includes a different SCell.

In aspect 9, the method of any of aspects 4-8 further includes that the L1-SINR measurement falling below the quality threshold indicates a link degradation for at least one of an uplink beam or a downlink beam of the at least one active downlink and uplink beam pair.

In aspect 10, the method of any of aspects 1-3 further includes that the UE determines to transmit the BFRQ using the uplink resource of the SCell if the L1-SINR measurement for the at least one active downlink and uplink beam pair is above a quality threshold.

In aspect 11, the method of aspect 10 further includes that the UE transmits the BFRQ to the base station in at least one of: UCI of the SCell, or a PUSCH through a MAC-CE of the SCell.

In aspect 12, the method of aspect 11 further includes transmitting, to the base station, a scheduling request via a different cell for the uplink resource to send the BFRQ for the SCell after transmitting one or more retransmissions of the BFRQ to the base station via the UCI or the PUSCH through the MAC-CE of the SCell.

In aspect 13, the method of aspect 12 further includes that the UE transmits the scheduling request to the base station via the uplink resource of the different cell if the UE transmits a maximum number of retransmissions of the BFRQ to the base station via the UCI or the PUSCH through the MAC-CE of the SCell.

In aspect 14, the method of aspect 12 or aspect 13 further includes that the UE transmits each of the one or more retransmissions of the BFRQ after a timer expires following a prior transmission of the BFRQ.

In aspect 15, the method of any of aspects 12-14 further includes that the different cell includes the PCell.

In aspect 16, the method of any of aspects 12-14 further includes that the different cell includes a different SCell.

In aspect 17, the method of any of aspects 1-16 further includes that the BFRQ indicates a full failure of multiple active downlink and uplink beam pairs.

In aspect 18, the method of aspect 17 further includes that the BFRQ indicates that the beam failure is due to self-interference or a link degradation.

In aspect 19, the method of any of aspects 1-16 further includes that the BFRQ indicates the beam failure for a subset of active downlink and uplink beam pairs.

In aspect 20, the method of aspect 19 further includes that the BFRQ identifies a failure for at least one of an uplink beam or a downlink beam of the subset of the active downlink and uplink beam pairs.

In aspect 21, the method of aspect 20 further includes that the BFRQ indicates that the beam failure is due to self-interference or a link degradation.

Aspect 22 is an apparatus for wireless communication at a UE, comprising means to perform the method of any of aspects 1-21.

In aspect 23, the apparatus of aspect 22 further includes at least one antenna and a transceiver coupled to the at least one antenna.

Aspect 24 is an apparatus for wireless communication at a UE, comprising: memory; and at least one processor coupled to the memory, the memory and at least one processor being configured to perform the method of any of aspects 1-21.

In aspect 25, the apparatus of aspect 24 further includes at least one antenna and a transceiver coupled to the at least one antenna and the at least one processor.

Aspect 26 is a non-transitory computer-readable medium storing computer executable code for wireless communication at a UE, the code when executed by a processor cause the processor to perform the method of any of aspects 1-21.

Aspect 27 is a method of wireless communication at a base station, comprising: serving as an SCell for full duplex communication with a UE configured with at least one active downlink and uplink beam pair; and receiving a BFRQ from the UE indicating a beam failure for the at least one active downlink and uplink beam pair for the SCell due to self-interference on the SCell for the full duplex communication.

In aspect 28, the method of aspect 27 further includes that the base station receives the BFRQ on uplink resources of the SCell.

In aspect 29, the method of aspect 27 or aspect 28 further includes that the base station receives the BFRQ from the UE in at least one of: UCI of the SCell, or a PUSCH through a MAC-CE of the SCell.

In aspect 30, the method of aspect 27 further includes receiving, in first uplink resources of a different cell, a scheduling request for second uplink resources for the UE to send the BFRQ for the SCell; transmitting, to the UE, an uplink grant to the different cell in response to receiving the scheduling request; and receiving, via the different cell, the BFRQ for the SCell using the second uplink resources indicated in the uplink grant.

In aspect 31, the method of aspect 30 further includes that the base station receives the BFRQ via the different cell in one or more of: a PUCCH based on the uplink grant, UCI on a PUSCH based on the uplink grant, or the PUSCH through a MAC-CE based on the uplink grant.

In aspect 32, the method of aspect 30 or 31 further includes that the different cell includes a PCell.

In aspect 33, the method of aspect 30 or 31 further includes that the different cell includes a different SCell.

In aspect 34, the method of any of aspects 27-33 further includes that the BFRQ indicates a full failure of multiple downlink and uplink beam pairs.

In aspect 35, the method of aspect 34 further includes that the BFRQ indicates that the beam failure is due to the self-interference or a link degradation.

In aspect 36, the method of any of aspects 27-33 further includes that the BFRQ indicates the beam failure for a subset of active downlink and uplink beam pairs.

In aspect 37, the method of aspect 36 further includes that the BFRQ identifies a failure for at least one of an uplink beam or a downlink beam of the subset of the active downlink and uplink beam pairs.

In aspect 38, the method of aspect 37 further includes that the BFRQ indicates that the beam failure is due to the self-interference or a link degradation.

Aspect 39 is an apparatus for wireless communication at a base station, comprising means to perform the method of any of aspects 27-38.

In aspect 40, the apparatus of aspect 39 further includes at least one antenna and a transceiver coupled to the at least one antenna.

Aspect 41 is an apparatus for wireless communication at a base station, comprising: memory; and at least one processor coupled to the memory, the memory and at least one processor being configured to perform the method of any of aspects 27-38.

In aspect 42, the apparatus of aspect 41 further includes at least one antenna and a transceiver coupled to the at least one antenna and the at least one processor.

Aspect 43 is a non-transitory computer-readable medium storing computer executable code for wireless communication at a base station, the code when executed by a processor cause the processor to perform the method of any of aspects 27-38.

What is claimed is:

1. An apparatus for wireless communication at a user equipment (UE), comprising:
one or more memories; and
one or more processors coupled to the one or more memories, wherein the one or more processors are configured to:
detect a beam failure for at least one active downlink and uplink beam pair for full duplex communication with a secondary cell (SCell); and
transmit a beam failure recovery request (BFRQ) for the SCell to a base station using an uplink resource of the SCell or a primary cell (PCell) based on a layer 1 signal to interference and noise ratio (L1-SINR) measurement for the at least one active downlink and uplink beam pair of the SCell,
wherein the uplink resource is of the SCell if the L1-SINR measurement for the at least one active downlink and uplink beam pair is above a quality threshold,
wherein the BFRQ is in at least one of: uplink control information (UCI) of the SCell, or a physical uplink shared channel (PUSCH) through a medium access control-control element (MAC-CE) of the SCell; and
transmit, to the base station, a scheduling request via a different cell for the uplink resource to send the BFRQ for the SCell after one or more retransmissions of the BFRQ to the base station via the UCI or the PUSCH through the MAC-CE of the SCell.

2. The apparatus of claim 1, wherein the uplink resource is of the PCell if the L1-SINR measurement for the at least one active downlink and uplink beam pair is below the quality threshold a number of times based on a maximum count for beam failure instances.

3. The apparatus of claim 1,
wherein the one or more processors are configured to detect that the beam failure for the at least one active downlink and uplink beam pair that is due to self-interference.

4. The apparatus of claim 1, wherein the one or more processors are further configured to:
transmit, to the base station, a scheduling request via a different cell for the uplink resource to send the BFRQ for the SCell based on the L1-SINR measurement for the at least one active downlink and uplink beam pair falling below a quality threshold.

5. The apparatus of claim 4, wherein the one or more processors are further configured to:
receive an uplink grant of the different cell from the base station in response to the scheduling request; and
transmit, to the base station, the BFRQ for the SCell using the uplink resource of the different cell indicated in the uplink grant.

6. The apparatus of claim 5, wherein the BFRQ is in one or more of:
a physical uplink control channel (PUCCH) based on the uplink grant,
uplink control information (UCI) on a physical uplink shared channel (PUSCH) based on the uplink grant, or
the PUSCH through a medium access control-control element (MAC-CE) based on the uplink grant.

7. The apparatus of claim 4, wherein the different cell includes the PCell or a different SCell.

8. The apparatus of claim 4, wherein the L1-SINR measurement falling below the quality threshold indicates a link degradation for at least one of an uplink beam or a downlink beam of the at least one active downlink and uplink beam pair.

9. The apparatus of claim 1, wherein the scheduling request is in the uplink resource of the different cell if the UE transmits a maximum number of retransmissions of the BFRQ to the base station via the UCI or the PUSCH through the MAC-CE of the SCell.

10. The apparatus of claim 1, wherein each of the one or more retransmissions of the BFRQ occur after a timer expires following a prior transmission of the BFRQ.

11. The apparatus of claim 1, wherein the different cell includes the PCell or a different SCell.

12. The apparatus of claim 1, wherein the BFRQ indicates a full failure of multiple active downlink and uplink beam pairs.

13. The apparatus of claim 12, wherein the BFRQ indicates that the beam failure is due to self-interference or a link degradation.

14. The apparatus of claim 1, wherein the BFRQ indicates the beam failure for a subset of active downlink and uplink beam pairs.

15. The apparatus of claim 14, wherein the BFRQ identifies a failure for at least one of an uplink beam or a downlink beam of the subset of the active downlink and uplink beam pairs.

16. The apparatus of claim 15, wherein the BFRQ indicates that the beam failure is due to self-interference or a link degradation.

17. A method of wireless communication at a user equipment (UE), comprising:
detecting a beam failure for at least one active downlink and uplink beam pair for full duplex communication with a secondary cell (SCell); and
transmitting a beam failure recovery request (BFRQ) for the SCell to a base station using an uplink resource of the SCell or a primary cell (PCell) based on a layer 1 signal to interference and noise ratio (L1-SINR) measurement for the at least one active downlink and uplink beam pair of the SCell,
wherein the uplink resource is of the SCell if the L1-SINR measurement for the at least one active downlink and uplink beam pair is above a quality threshold,
wherein the BFRQ is in at least one of: uplink control information (UCI) of the SCell, or a physical uplink shared channel (PUSCH) through a medium access control-control element (MAC-CE) of the SCell; and
transmitting, to the base station, a scheduling request via a different cell for the uplink resource to send the BFRQ for the SCell after one or more retransmissions of the BFRQ to the base station via the UCI or the PUSCH through the MAC-CE of the SCell.

18. The method of claim 17, wherein the uplink resource is of the PCell if the L1-SINR measurement for the at least one active downlink and uplink beam pair is below the quality threshold a number of times based on a maximum count for beam failure instances.

19. The method of claim 17, wherein the method comprises detecting that the beam failure for the at least one active downlink and uplink beam pair that is due to self-interference.

20. The method of claim 17, wherein the method comprises:
transmitting, to the base station, a scheduling request via a different cell for the uplink resource to send the BFRQ for the SCell based on the L1-SINR measurement for the at least one active downlink and uplink beam pair falling below a quality threshold.

21. The apparatus of claim 20, wherein the method comprises:
receiving an uplink grant of the different cell from the base station in response to the scheduling request; and
transmitting, to the base station, the BFRQ for the SCell using the uplink resource of the different cell indicated in the uplink grant.

22. The method of claim 21, wherein the BFRQ is in one or more of:
a physical uplink control channel (PUCCH) based on the uplink grant,
uplink control information (UCI) on a physical uplink shared channel (PUSCH) based on the uplink grant, or
the PUSCH through a medium access control-control element (MAC-CE) based on the uplink grant.

23. The method of claim 20, wherein the different cell includes the PCell or a different SCell.

24. The method of claim 20, wherein the L1-SINR measurement falling below the quality threshold indicates a link degradation for at least one of an uplink beam or a downlink beam of the at least one active downlink and uplink beam pair.

25. The apparatus of claim 17, wherein the scheduling request is in the uplink resource of the different cell if the UE transmits a maximum number of retransmissions of the BFRQ to the base station via the UCI or the PUSCH through the MAC-CE of the SCell.

26. The apparatus of claim 17, wherein each of the one or more retransmissions of the BFRQ occur after a timer expires following a prior transmission of the BFRQ.

27. The apparatus of claim 17, wherein the different cell includes the PCell or a different SCell.

28. The method of claim 17, wherein:
the BFRQ indicates a full failure of multiple active downlink and uplink beam pairs and the BFRQ indicates that the beam failure is due to self-interference or a link degradation; or
the BFRQ indicates the beam failure for a subset of active downlink and uplink beam pairs, the BFRQ identifies a failure for at least one of an uplink beam or a downlink beam of the subset of the active downlink and uplink beam pairs, and the BFRQ indicates that the beam failure is due to self-interference or a link degradation.

29. An apparatus for wireless communication at a base station, comprising:
one or more memories; and
one or more processors coupled to the one or more memories, wherein the one or more processors are configured to:
serve as a secondary cell (SCell) for full duplex communication with a user equipment (UE) configured with at least one active downlink and uplink beam pair; and
receive, from the UE, a beam failure recovery request (BFRQ) for the SCell using an uplink resource of the SCell or a primary cell (PCell) based on a layer 1 signal to interference and noise ratio (L1-SINR) measurement for the at least one active downlink and uplink beam pair
wherein the beam failure recovery request (BFRQ) indicates a beam failure for the at least one active downlink and uplink beam pair
wherein the uplink resource is of the SCell if the L1-SINR measurement for the at least one active downlink and uplink beam pair is above a quality threshold,
wherein the BFRQ is in at least one of: uplink control information (UCI) of the SCell, or a physical uplink shared channel (PUSCH) through a medium access control-control element (MAC-CE) of the SCell; and
receive, from the UE, a scheduling request via a different cell for the uplink resource to send the BFRQ for the SCell after one or more retransmissions of the BFRQ to the base station via the UCI or the PUSCH through the MAC-CE of the SCell.

30. A method of wireless communication at a base station, comprising:
serving as a secondary cell (SCell) for full duplex communication with a user equipment (UE) configured with at least one active downlink and uplink beam pair; and
receiving, from the UE, a beam failure recovery request (BFRQ) for the SCell using an uplink resource of the SCell or a primary cell (PCell) based on a layer 1 signal to interference and noise ratio (L1-SINR) measurement for the at least one active downlink and uplink beam pair
wherein the beam failure recovery request (BFRQ) indicates a beam failure for the at least one active downlink and uplink beam pair
wherein the uplink resource is of the SCell if the L1-SINR measurement for the at least one active downlink and uplink beam pair is above a quality threshold,
wherein the BFRQ is in at least one of: uplink control information (UCI) of the SCell, or a physical uplink shared channel (PUSCH) through a medium access control-control element (MAC-CE) of the SCell, and
receiving, from the UE, a scheduling request via a different cell for the uplink resource to send the BFRQ for the SCell after one or more retransmissions of the BFRQ to the base station via the UCI or the PUSCH through the MAC-CE of the SCell.

* * * * *